US010185400B2

(12) United States Patent
Baldwin et al.

(10) Patent No.: US 10,185,400 B2
(45) Date of Patent: Jan. 22, 2019

(54) GESTURE CONTROL DEVICE WITH FINGERTIP IDENTIFICATION

(71) Applicants: James Armand Baldwin, Palo Alto, CA (US); Guo Chen, Shanghai (CN); Yang Li, Shanghai (CN); Gladys Yuen Yan Wong, Fremont, CA (US)

(72) Inventors: James Armand Baldwin, Palo Alto, CA (US); Guo Chen, Shanghai (CN); Yang Li, Shanghai (CN); Gladys Yuen Yan Wong, Fremont, CA (US)

(73) Assignee: Antimatter Research, Inc., Palo Alto, CA (US)

( * ) Notice: Subject to any disclaimer, the term of this patent is extended or adjusted under 35 U.S.C. 154(b) by 0 days.

(21) Appl. No.: 15/135,528

(22) Filed: Apr. 21, 2016

(65) Prior Publication Data
US 2017/0199575 A1 Jul. 13, 2017

Related U.S. Application Data

(60) Provisional application No. 62/276,972, filed on Jan. 11, 2016.

(51) Int. Cl.
*G06F 3/01* (2006.01)
*G06K 9/62* (2006.01)
*H04N 5/33* (2006.01)
*H04N 5/225* (2006.01)

(52) U.S. Cl.
CPC .............. *G06F 3/017* (2013.01); *G06F 3/011* (2013.01); *G06K 9/6267* (2013.01); *H04N 5/2256* (2013.01); *H04N 5/33* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,773,352 B1 * | 7/2014 | Huang | ..................... | G09G 5/00 345/156 |
| 8,819,812 B1 * | 8/2014 | Weber | ..................... | G06F 3/017 726/18 |
| 9,465,484 B1 * | 10/2016 | Kamarshi | ................ | G06F 3/042 |
| 2009/0002342 A1 * | 1/2009 | Terada | ..................... | G06F 3/011 345/175 |
| 2009/0309848 A1 * | 12/2009 | Terada | .................. | G06F 3/0425 345/173 |
| 2011/0206273 A1 * | 8/2011 | Plagemann | ......... | G06K 9/00342 382/154 |
| 2012/0309532 A1 * | 12/2012 | Ambrus | ................ | G06F 3/0425 463/36 |
| 2014/0004834 A1 * | 1/2014 | Mian | ....................... | G06F 3/017 455/414.1 |
| 2014/0147035 A1 * | 5/2014 | Ding | ........................ | G06F 3/017 382/164 |
| 2015/0309663 A1 * | 10/2015 | Seo | ........................ | G06F 3/0421 345/175 |
| 2015/0346831 A1 * | 12/2015 | Nii | ........................... | G06F 3/017 345/173 |
| 2016/0224191 A1 * | 8/2016 | Osamura | ............... | G06F 3/0425 |

* cited by examiner

*Primary Examiner* — Priyank J Shah
(74) *Attorney, Agent, or Firm* — Larisa Migachyov

(57) ABSTRACT

A gesture-control interface is disclosed, comprising a camera, an infrared LED flash, and a processor that identifies the finger motion in the image.

14 Claims, 9 Drawing Sheets

GESTURE CONTROL DEVICE WITH FINGERTIP IDENTIFICATION

CROSS-REFERENCE TO RELATED APPLICATIONS

The present application takes priority from Provisional App. No. 62/276,972, filed Jan. 11, 2016, which is herein incorporated by reference.

BACKGROUND

Field of the Invention

The present invention relates generally to user interface devices, and more specifically to touchless user interface devices that use hand gestures.

Background of the Invention

Humans have been using hand gestures to communicate for as long as there have been humans. The human hand is a versatile and highly expressive communication organ. As technology gets more and more omnipresent in our lives, the idea of using hand gestures to communicate with the various technological objects we use becomes more and more appealing.

There are some attempts to create a gesture interface to communicate with a computer or tablet. Such attempts tend to leverage the computer's power and resources to receive images of a person's hand, process those images, and interpret the person's gestures. However, all of this is very resource-intensive and takes up a lot of computing power.

A need exists for a gesture interface for simpler devices that have little or no computing power—light switches, lamps, appliances, and so on. While motion sensors are currently used for such devices, a motion sensor cannot communicate detailed information such as may be needed to operate an appliance or even a light with a dimmer switch. However, the no-touch nature of a motion sensor may be desirable for some applications—for example, in an operating room of a hospital where touch may compromise sterility.

SUMMARY OF THE INVENTION

An object of the present invention is to provide a gesture interface for a device with minimal computing power that is self-contained, simple, and cheap.

Another object of the present invention is to provide a system and method for identifying finger motions.

The method of the present invention preferably comprises illuminating a hand using a first frequency of light (preferably infrared), taking a first image of the hand using a camera, turning off illumination and taking a second image of the hand, subtracting the second image from the first image to obtain a clean image, and determining the location of at least one fingertip. This process is repeated at least once, and the change in position is used to determine the trajectory of the at least one fingertip.

In an embodiment, the illumination is turned on and off at a regular frequency of 120 Hz and the camera takes images at a regular frequency of 240 Hz.

In an embodiment, the image is cropped to just the image of the hand to remove unnecessary blank space. This is preferably done by using an adaptive filter to binary the image, determining pixel intensity in the image, and cropping the image to just the rectangular area where pixel intensity is nonzero.

In an embodiment, the step of determining the location of a fingertip comprises finding all the extreme points in the image, and using a random tree classifier to classify what part of the hand each extreme point belongs to; for each extreme point belonging to a fingertip, a mean shift method is used to determine the location of the fingertip.

In an embodiment, the extreme points are found by processing the image to change all the points whose values are above a certain value to white and all the other points to black; the center of the image is selected as an initial extreme point. Then, the geodesic distance from the initial extreme point to the edge of the image is determined, and the point at the maximum geodesic distance is marked as the new extreme point. The step of finding the maximum geodesic distance to the edge of the image is then repeated for the new extreme point, until all the extreme points have been found.

In an embodiment, the extreme points are found by separating the image into at least two areas by value range and finding the top ten brightest areas. The center of each of the top ten brightest areas is an extreme point.

Once the trajectory of the fingertip is determined, it may be used to control any device; examples include a music player, a toilet, a water faucet, a shower, a thermostat, or medical equipment.

A system of the present invention preferably comprises a camera, a light source, and a processor that performs the above functions.

LIST OF FIGURES

FIG. 9 shows a diagram of using a random tree classifier to determine what part of the hand each extreme point belongs to.

DETAILED DESCRIPTION OF THE PREFERRED EMBODIMENT

Several embodiments of the present invention are described below. It will be understood that the present invention encompasses all reasonable equivalents to the below-described embodiments, as is evident to a person of reasonable skill in the art.

Figure 1:
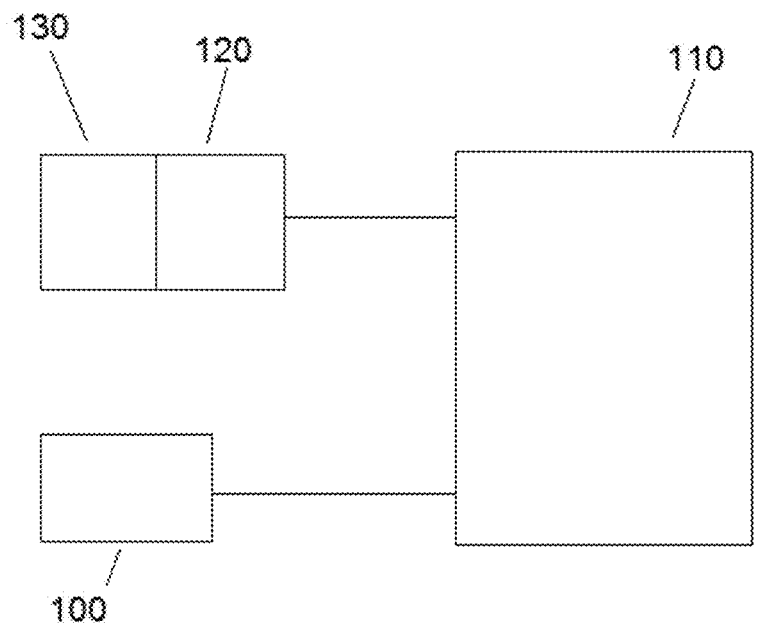
FIG. 1 shows a block diagram of an embodiment of the present invention.

A block diagram of an embodiment of the system of the present invention is shown in FIG. 1. An infrared LED 100 is connected to a processor 110. An infrared camera 120 with an infrared filter 130 is also connected to the processor. The camera is preferably of sufficient quality to produce an image of a human hand at a distance of up to 1 meter from the camera. Preferably, the camera is an Omnivision OV6211, which is a 10 bit monochrome camera with a 400 by 400 resolution (0.16 Megapixel) CMOS sensor and combined with a 1/10.5" lens. The infrared LED is preferably an 850 nm LED similar to an OSLON SFH4710.

Figure 2:
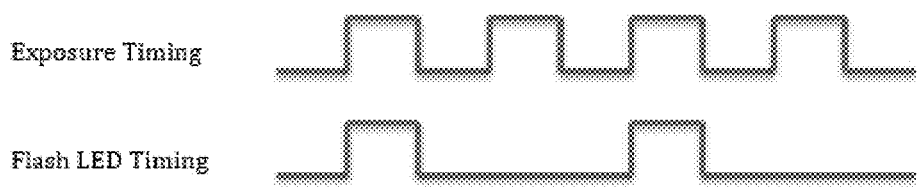
FIG. 2 shows a timing diagram of the flash and camera trigger patterns.

In the preferred embodiment, the infrared LED flashes on and off at regular intervals, and the camera is triggered to take a photographic image of the hand with and without the infrared illumination. FIG. 2 shows a diagram of the way this occurs. For every cycle, the camera therefore produces two images—one with the hand illuminated by the LED and one without the illumination. The images are preferably taken close enough together that there is no appreciable movement of the hand between the two images. In the preferred embodiment, the LED is triggered to flash at a frequency of 60 Hz, while the camera is triggered to take images at a frequency of 120 Hz. However, any other frequency or irregular intervals may be used as long as the image of the hand with IR illumination and the image of the hand without IR illumination are taken close enough together that there is no appreciable movement of the hand between the two.

Figure 3:
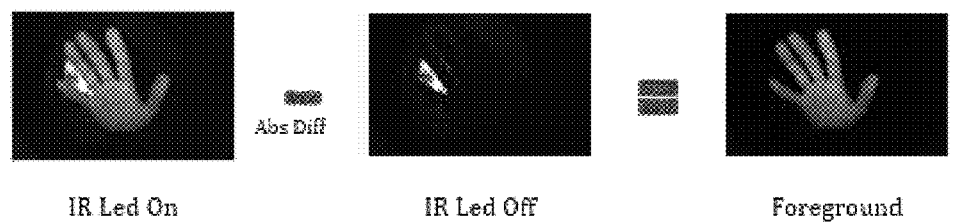
FIG. 3 shows an embodiment of the process of subtracting the background from the image of the hand.

After the two images are taken (one with IR illumination and one without), the processor preferably subtracts one image from the other to remove the background. FIG. 3 shows an example of how this is done. After the subtraction is done, a clean image is obtained.

Figure 4:
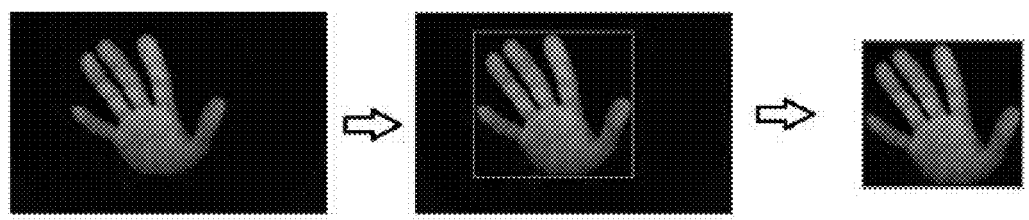
FIG. 4 shows an embodiment of the process of cropping the image.

In an embodiment, the image is cropped to remove extraneous blank space and to save memory. This is preferably done in a manner shown in FIG. 4. An adaptive filter is used to binary the image. Then, the processor determines the pixel intensity in the image. The image is then cropped to just the rectangular area where pixel intensity is nonzero, as shown in the Figure.

Figure 5:
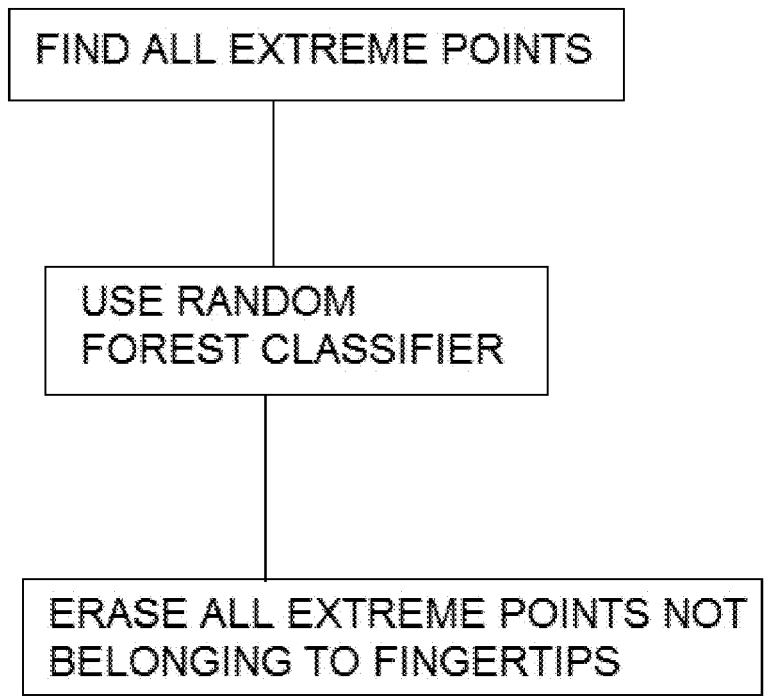
FIG. 5 shows a diagram of the process of finding the extreme points.

The processor then analyzes the image to determine the location of at least one fingertip. As shown in FIG. 5, this is done by first finding all extreme points—i.e. points that could possibly be a fingertip. Then, a random forest classifier is used to find out which extreme points belong to a fingertip.

Figure 6:
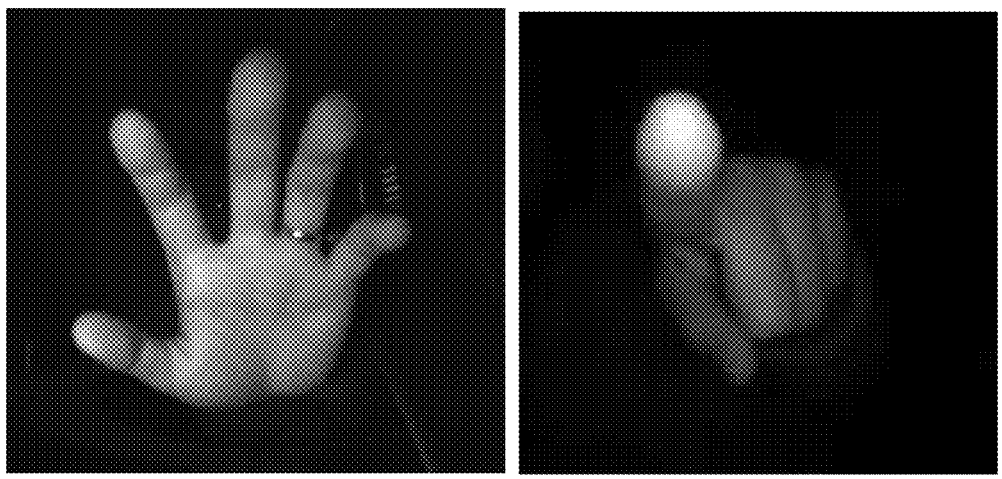
FIG. 6 shows two possible finger orientations for an image.

There are two methods for finding extreme points, since a finger can be in two different positions with respect to the camera. The finger can either be perpendicular to the camera axis, or pointing directly at the camera. If it is perpendicular to the camera axis, a fingertip is the end of an elongated blob. If it is pointing directly at the camera, a fingertip is a round blob. FIG. 6 shows the two possible finger positions.

Figure 7:
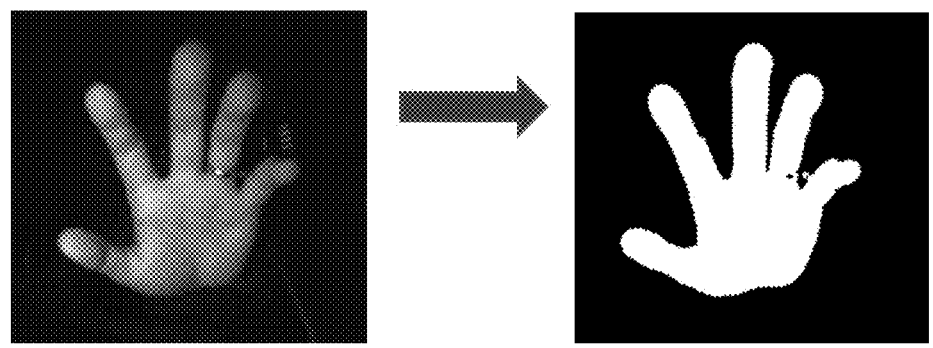
FIG. 7 shows a diagram of creating a binary mask using a threshold grayscale value.

One method for finding extreme points works best for a finger that is perpendicular to the camera axis. In that method, the image is first processed to get a binary mask using a threshold grayscale value, as shown in FIG. 7. This results in a white outline of the hand on a black background as shown in the figure.

Next, the processor finds the center of the image and marks it as an initial extreme point. The processor then measures the geodesic distance from the center of the image to the edge of the white outline, and marks the point that is at the maximum geodesic distance from it. That is the new extreme point. Then, the geodesic distance from the new extreme point to the edge is measured and the point that is at the maximum geodesic distance from it is marked as a new extreme point. The process is repeated until all the extreme points have been found.

Figure 8:
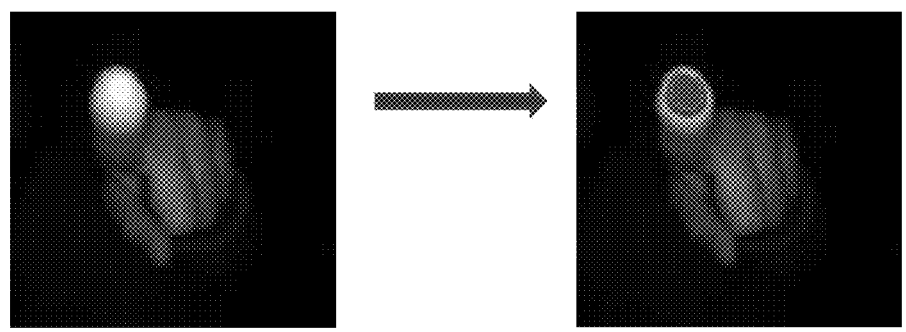
FIG. 8 shows a diagram of separating an image into areas by value range.

Another embodiment of the method for finding extreme points works best when a finger is pointing directly at the camera. In this method, as shown in FIG. 8, the image of the hand is separated into areas by value range. The top ten brightest areas are marked, and the center of each area is found. Those are the extreme points.

In the preferred embodiment, both of these methods are used to find extreme points, to result in the largest possible set of extreme points.

After the extreme points are found, a random tree classifier is used to determine what hand part or background each extreme point belongs to. In the preferred embodiment, a random forest classifier is used. This is an ensemble of several decision trees. Each is a simple tree predictor that produces a response when presented with a set of predictor values. For the present invention, the response is a class membership (i.e. what part of the hand the extreme point belongs to), which associates or classifies a set of independent predictor values with one of the categories present in the dependent variable. The initial training set and the feature for every split is random.

For every extreme point, a feature vector is calculated to describe the content of the image. That vector is the input of every decision tree in the forest. For every node of the decision tree, there is a split function that tests a specific part of the feature vector, with the test result determining whether you go right or left. For each leaf node, there is a probability distribution for the category variable. Finally, all the distributions are combined to get the final estimate of what hand part the point belongs to. The extreme points belonging to the fingertips are saved; the other ones are deleted.

Figure 9:
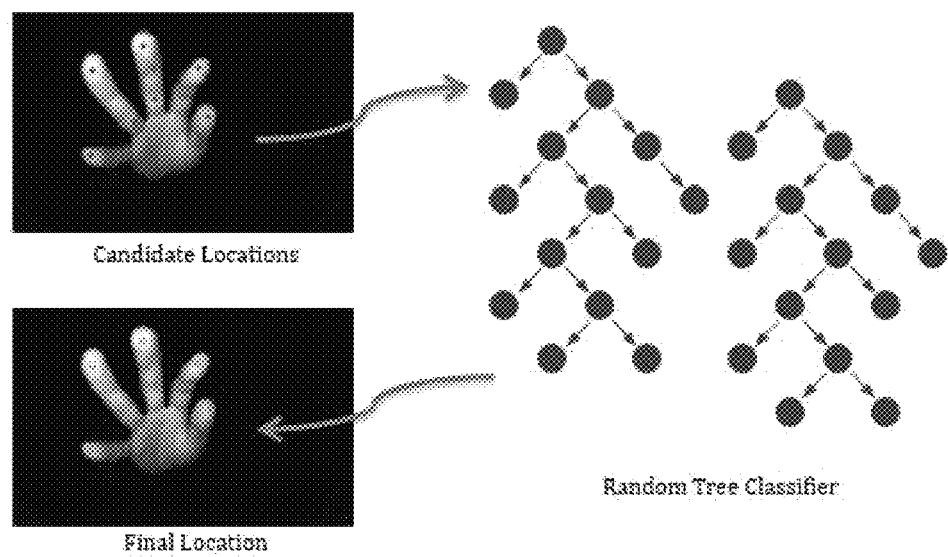

Then, a mean shift method is used on every remaining extreme point to get the accurate location of the fingertips. This process is shown in FIG. 9.

Once the fingertips are found, subsequent images are analyzed to determine the trajectory of one or more fingertips. For example, a finger could trace a circle or rectangle in the air. Two fingers could move in a parabola pattern. The system preferably can recognize a particular set of trajectory shapes and use them to control the device in need of controlling.

The applications of the present invention can be numerous. For example, a user could turn on a water faucet with a hand gesture, and change the water temperature with another hand gesture. A user could use a hand gesture to turn on a music player and another hand gesture to control its volume. A hand gesture could be used to flush a toilet and different hand gestures could be used to trigger the toilet to perform other functions, such as bidet functions, heating the seat, air-drying functions, and so on. In a hospital setting, different hand gestures could be used to control various medical equipment without touching it and thus compromising sterility. Due to the present invention's simplicity, it could be built into a device easily without increasing its footprint or energy usage, or it could be a separate standalone module that could be connected to a device wirelessly or by a cable.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A method for recognizing hand gestures, comprising:
   illuminating a hand using a first frequency of light;
   taking a first image of the hand using a camera;
   turning off illumination with the first frequency of light;
   taking a second image of the hand using the camera;
   subtracting the second image from the first image to obtain a clean image of the hand;
   determining the location of at least one fingertip, wherein this step comprises:
      finding all extreme points in the image, wherein an extreme point is a location where the difference in pixel intensity in at least two directions away from the extreme point is above a threshold value;
      for each extreme point, using a random tree classifier to classify what part of the hand the extreme point belongs to;
      for each extreme point belonging to a fingertip, using a mean shift method to get the accurate location of the fingertip;
   repeating at least once the steps of illuminating a hand, taking a first image, turning off illumination, taking a second image, subtracting the second image from the first image to obtain a clean image, and determining the location of at least one fingertip;
   determining the change in position of the at least one fingertip;
   using the change in position of the at least one fingertip to determine a trajectory of the at least one fingertip.

2. The method of claim 1, wherein the first frequency of light is infrared and where the camera is an infrared camera.

3. The method of claim 1, wherein the steps of illuminating and turning off illumination are repeated at a frequency of 120 Hz.

4. The method of claim 1, further comprising:
   after subtracting the second image from the first image, using an adaptive threshold method to binary the image;
   determine pixel intensity in the image;
   determine the longest vertical range where the pixel intensity is nonzero;
   determine the longest horizontal range where the pixel intensity is nonzero;
   cropping the image to the longest vertical range and the longest horizontal range.

5. The method of claim 1, where the step of finding all extreme points in the image comprises:
   processing the image to change all the points whose values are above a certain threshold to white, and all the points whose values are below a certain threshold to black, to obtain a processed image with a black area and a white area;
   selecting a center of the processed image as an extreme point;
   finding a point at the edge of the white area that has the longest geodesic distance from the extreme point and marking that point as an extreme point;
   repeating the step of finding a point at the edge of the white area that has the longest geodesic distance from the extreme point and marking the point as an extreme point until all the extreme points have been found.

6. The method of claim 1, where the step of finding all extreme points in the image comprises:
   separating the image into at least two areas by value range;
   finding the top ten brightest areas;
   determining the center of each of the top ten brightest areas.

7. The method of claim 1, further comprising:
   using the trajectory of the at least one fingertip to control one of the following: a light switch, a music player, a toilet, a water faucet, a shower, a thermostat, medical equipment.

8. A system for controlling a device, said system comprising:
   a camera;
   a light source;
   a processor connected to the camera and to the light source, said processor configured to perform the following steps:
   illuminating a hand using a first frequency of light;
   taking a first image of the hand using a camera;
   turning off illumination with the first frequency of light;
   taking a second image of the hand using the camera;
   subtracting the second image from the first image to obtain a clean image of the hand;
   determining the location of at least one fingertip using the following steps:
      1. finding all extreme points in the image, wherein an extreme point is a location where the difference in pixel intensity in at least two directions away from the extreme point is above a threshold value;
      2. for each extreme point, using a random tree classifier to classify what part of the hand the extreme point belongs to;
      3. for each extreme point belonging to a fingertip, using a mean shift method to get the accurate location of the fingertip;

repeating at least once the steps of illuminating a hand, taking a first image, turning off illumination, taking a second image, subtracting the second image from the first image to obtain a clean image, and determining the location of at least one fingertip;

determining the change in position of the at least one fingertip;

using the change in position of the at least one fingertip to determine a trajectory of the at least one fingertip.

9. The system of claim 8, wherein the light source emits infrared light and where the camera is an infrared camera.

10. The system of claim 8, wherein the light source is turned on and off at a frequency of 120 Hz.

11. The system of claim 8, wherein the processor is further configured to perform the following actions:

after subtracting the second image from the first image, using an adaptive threshold method to binary the image;

determine pixel intensity in the image;

determine the longest vertical range where the pixel intensity is nonzero;

determine the longest horizontal range where the pixel intensity is nonzero;

cropping the image to the longest vertical range and the longest horizontal range.

12. The system of claim 8, where the processor is configured to find all the extreme points in an image by performing the following actions:

processing the image to change all the points whose values are above a certain threshold to white, and all the points whose values are below a certain threshold to black, to obtain a processed image with a black area and a white area;

selecting a center of the processed image as the initial extreme point;

for every angle from 0 degrees to 360 degrees, determining a distance from the center of the processed image to the boundary of the white area along a straight line path that forms that angle with the horizontal;

for every angle where the distance forms a local maximum, marking the intersection of the corresponding straight line path and the boundary of the white area as an extreme point.

13. The system of claim 8, where the processor is configured to find all the extreme points in the image by performing the following steps:

separating the image into at least two areas by value range;

finding the top ten brightest areas;

determining the center of each of the top ten brightest areas;

using a random tree classifier to determine whether or not each center belongs to a fingertip.

14. The system of claim 8, further comprising:

an interface that enables the processor to control at least one of the following: a light switch, a music player, a toilet, a water faucet, a shower, a thermostat, medical equipment.

* * * * *